United States Patent
Ho et al.

(10) Patent No.: US 6,912,559 B1
(45) Date of Patent: Jun. 28, 2005

(54) SYSTEM AND METHOD FOR IMPROVING THE ACCURACY OF RECIPROCAL SQUARE ROOT OPERATIONS PERFORMED BY A FLOATING-POINT UNIT

(75) Inventors: Ying-wai Ho, Los Altos, CA (US); Michael J. Schulte, Bethlehem, PA (US); John L. Kelley, San Francisco, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 501 days.

(21) Appl. No.: 09/363,637

(22) Filed: Jul. 30, 1999

(51) Int. Cl.[7] ............................. G06F 7/38; G06F 5/552
(52) U.S. Cl. ...................................... 708/502; 708/500
(58) Field of Search ................................ 708/500, 502, 708/605

(56) References Cited

U.S. PATENT DOCUMENTS

| | | | |
|---|---|---|---|
| 4,156,279 A | 5/1979 | Wilhite | 364/200 |
| 4,511,990 A | 4/1985 | Hagiwara et al. | 364/748 |
| 4,839,846 A | 6/1989 | Hirose et al. | |
| 4,866,652 A | 9/1989 | Chu et al. | 364/748 |
| 4,879,676 A | 11/1989 | Hansen | 364/748 |
| 5,025,407 A | 6/1991 | Gulley et al. | |
| 5,038,313 A | 8/1991 | Kojima | |
| 5,159,665 A | 10/1992 | Priem et al. | 395/134 |
| 5,185,713 A | 2/1993 | Kobunaya | 364/748 |
| 5,206,823 A * | 4/1993 | Hesson | 708/500 |
| 5,220,524 A * | 6/1993 | Hesson | 708/500 |
| 5,257,216 A | 10/1993 | Sweedler | 364/748 |
| 5,278,949 A | 1/1994 | Thayer | 395/126 |
| 5,341,321 A * | 8/1994 | Karp et al. | 708/500 |
| 5,357,599 A | 10/1994 | Luken | 395/134 |
| 5,359,548 A | 10/1994 | Yoshizawa et al. | 364/748 |
| 5,367,650 A | 11/1994 | Sharangpani et al. | |
| 5,392,228 A | 2/1995 | Burgess et al. | 364/715.04 |
| 5,420,966 A | 5/1995 | Silverbrook | 395/122 |
| 5,420,971 A | 5/1995 | Westerink et al. | 395/133 |
| 5,511,016 A | 4/1996 | Bechade | |
| 5,517,438 A | 5/1996 | Dao-Trong et al. | 364/748 |
| 5,530,663 A | 6/1996 | Garcia et al. | 364/748 |
| 5,550,767 A | 8/1996 | Taborn et al. | |
| 5,550,768 A | 8/1996 | Ogilvie et al. | 364/748 |
| 5,553,015 A | 9/1996 | Elliott et al. | |
| 5,602,769 A | 2/1997 | Yu et al. | |

(Continued)

OTHER PUBLICATIONS

Ito et al., "Efficient Initial Approximation for Multiplicative Division and Square Root by a Multiplication with Operand Modification," (Apr. 1997); pp. 495–498, 4 pages.

Price, C., "MIPS IV Instruction Set," MIPS (Sep. 1995), pp. B–21, 22, 26, 47–49, 63, 81, 84, 88 and 96.

(Continued)

*Primary Examiner*—Tan V. Mai
(74) *Attorney, Agent, or Firm*—Sterne, Kessler, Goldstein & Fox P.L.L.C.

(57) ABSTRACT

The accuracy of approximating the reciprocal and the reciprocal square root of a number (N) is improved. Approximating the reciprocal of N includes: (a) estimating the reciprocal of N to produce an estimate ($X_i$); (b) determining a first intermediate result (IR1) according to the equation: $IR1 = 1 - N*X_i$; (c) multiplying IR1 by $X_i$ to produce a second intermediate result (IR2); and (d) adding $X_i$ to IR2 to produce an approximation of the reciprocal of N. Approximating the reciprocal square root includes: (a) estimating the reciprocal square root of N to produce $X_i$; (b) multiplying $X_i$ by N to produce IR1; (c) determining IR2 according to the equation: $IR2 = (1 - X_i*IR1)/2$; (d) multiplying IR2 by $X_i$ to produce a third intermediate result (IR3); and (e) adding IR3 to $X_i$ to produce an approximation of the reciprocal square root of the number.

24 Claims, 4 Drawing Sheets

U.S. PATENT DOCUMENTS

| | | | |
|---|---|---|---|
| 5,619,198 A | 4/1997 | Blackham et al. | |
| 5,631,859 A | 5/1997 | Markstein et al. | |
| 5,652,875 A | 7/1997 | Taylor | |
| 5,671,170 A | 9/1997 | Markstein et al. | |
| 5,671,401 A | 9/1997 | Harrell | 395/505 |
| 5,701,442 A | 12/1997 | Ronen | |
| 5,720,019 A | 2/1998 | Koss et al. | 395/134 |
| 5,726,927 A | 3/1998 | Wolrich et al. | 364/754 |
| 5,729,724 A | 3/1998 | Sharangpani et al. | 395/563 |
| 5,768,170 A | 6/1998 | Smith | |
| 5,774,709 A | 6/1998 | Worrell | 395/580 |
| 5,790,827 A | 8/1998 | Leung | 395/392 |
| 5,793,661 A | 8/1998 | Dulong et al. | 364/750.5 |
| 5,805,486 A | 9/1998 | Sharangpani | |
| 5,809,294 A | 9/1998 | Ando | 395/580 |
| 5,815,695 A | 9/1998 | James et al. | 395/561 |
| 5,847,979 A * | 12/1998 | Wong et al. | 708/605 |
| 5,848,269 A | 12/1998 | Hara | 395/586 |
| 5,852,726 A | 12/1998 | Lin et al. | 395/376 |
| 5,862,066 A | 1/1999 | Rossin et al. | |
| 5,867,682 A | 2/1999 | Witt et al. | 395/386 |
| 5,880,983 A | 3/1999 | Elliott et al. | 364/748.07 |
| 5,880,984 A | 3/1999 | Burchfiel et al. | 364/748.07 |
| 5,889,690 A | 3/1999 | Arakawa | 364/748.07 |
| 5,892,698 A | 4/1999 | Naffziger | 364/748.07 |
| 5,901,076 A | 5/1999 | Lynch | 364/748.11 |
| 5,923,577 A | 7/1999 | Wong et al. | |
| 5,928,316 A | 7/1999 | Wong et al. | 708/501 |
| 5,953,241 A | 9/1999 | Hansen et al. | 364/748.07 |
| 5,977,987 A | 11/1999 | Duluk, Jr. | |
| 5,995,122 A | 11/1999 | Hsieh et al. | |
| 5,996,066 A | 11/1999 | Yung | |
| 5,999,960 A | 12/1999 | Gerwig et al. | 708/500 |
| 6,035,316 A | 3/2000 | Peleg et al. | 708/523 |
| 6,065,115 A | 5/2000 | Sharangpani et al. | 712/235 |
| 6,115,729 A | 9/2000 | Matheny et al. | |
| 6,169,554 B1 | 1/2001 | Deering | 345/434 |
| 6,175,370 B1 | 1/2001 | Kunimatsu | 345/434 |
| 6,175,851 B1 | 1/2001 | Iourcha et al. | 708/505 |
| 6,175,907 B1 | 1/2001 | Elliott et al. | |
| 6,199,089 B1 | 3/2001 | Mansingh | |
| 6,249,798 B1 | 6/2001 | Golliver et al. | |
| 6,268,875 B1 | 7/2001 | Duluk, Jr. et al. | 345/506 |
| 6,275,838 B1 | 8/2001 | Blomgren et al. | 708/501 |
| 6,285,378 B1 | 9/2001 | Duluk, Jr. | 345/441 |
| 6,285,779 B1 | 9/2001 | Lapidous et al. | 382/106 |
| 6,298,365 B1 | 10/2001 | Dubey et al. | |
| 6,401,108 B1 | 6/2002 | Van Nguyen | |
| 6,426,746 B2 | 7/2002 | Hsieh et al. | |

OTHER PUBLICATIONS

"MIPS Extension for Digital Media with 3D," MIPS (Mar. 1997), 29 pages.

"MIPS V Instruction Set, Rev. 1.0" MIPS (1996), pp. B–1–B–37 (37 pages).

Rice et al., "Multiprecision Division on an 8–Bit Processor," Proceedings, 13th IEEE Symposium (Jul. 1997), pp. 74–81.

Sweetman, D., "See MIPS Run," Morgan Kaufmann Publishers, Inc., San Francisco, CA, (1999), pp. 91–114 and 149–173, 51 pages.

Uhler, M., "Optimizing Game Applications for the MIPS RISC Architecture," Computer Game Developer's Conference, San Jose, CA, (Feb. 1999), 14 pages.

Uhler, M., "Optimizing Game Applications for the MIPS RISC Architecture," Computer Game Developer's Conference, San Jose, CA, (Mar. 1999), slides 1–22.

Price, C., "MIPS R10000 MIPS IV ISA Manual, MIPS Instruction Set, MIPS IV Instruction Set Rev. 3.2," MIPS (Sep. 1995), 318 pages.

"MIPS® RISC Architecture, vol. 1, Introduction to the ISA," MIPS (Aug. 1998), 344 pages.

"MIPS® RISC Architecture, vol. 2, The Instruction Set," MIPS (Aug. 1998) 614 pages.

"AltiVec™ Technology Fact Sheet," Motorola, Inc., (1998), 2 pages.

"AltiVec™ Technology Programming Environments Manual, Rev. 0.1," Motorola, Inc., (Nov. 1998), 164 pages.

"AltiVec™ Technology Programming Interface Manual, Rev. 0," Motorola, Inc., (Jun. 1999), 261 pages.

Fuller, S., "Motorola's AltiVec™ Technology," [white paper], Motorola, (1998), 4 pages.

"3DNow!™ Technology Manual, Rev. C." Advanced Micro Devices, Inc. (May 1998), 72 pages.

"AltiVec™ Technology Programming Environments Manual, Preliminary Rev. 0.2," Motorola, Inc. (May 1998), pp. i–viii, xi–xviii, 1–1 thru 1–11, 4–16 thru 4–33, 6–82, 6–122, 6–135, and 6–143 (48 pages).

Higaki, et al., "A 2.5 GFLOPS 6.5 Million Polygons per Second 4–Way VLIW Geometry Processor with SIMD Instructions and a Software Bypass Mechanism," *1999 IEEE International Solid–State Circuits Conference*, Paper No. 15.3, 11 pages, IEEE, San Francisco, CA, Feb. 15–17, 1999.

Hughes, J.K., *PL/1 Programming,* John Wiley & Sons, Inc., pp. 5, 15–16, 74–75, 188–189, 327, 411–416, 423–424, and 689–690 (1973).

Heinrich, Joe, *MIPS R4000 Microprocessor User's Manual,* Second Edition, MIPS Technologies, 1994, pp. 154–155, 157, 159, 161,168, 170–171, B–9, B–10, B–13, B–17, B–19, B–21, B–23, B–27, B–38, B–40 and B–62 (19 pages total).

*AltiVec™ Technology Programming Environments Manual,* Preliminary REV 0.2, May 1998, pp. 4–16 thru 4–19 (4 pages total).

American National Standards Institute, An American National Standard—*IEEE Standard for Binary Floating–Point Arithmetic,* (IEEE Std 754–1985), New York, New York, ©1985, pp. I–vi and 1–14.

*3DNow!™ Technology Manual,* Advanced Micro Devices, 1998, pp. I–x and 1–62 (72 pages total).

*TMS32010 User's Guide,* Texas Instruments, 1983, p. 1183.

American National Standards Institute, *An American National Standard—IEEE Standard for Binary Floating–Point Arithmetic,* (IEEE Std 754–1985), New York, New York, ©1985, pp. i–vi and 1–14.

* cited by examiner

SYSTEM AND METHOD FOR IMPROVING THE ACCURACY OF RECIPROCAL SQUARE ROOT OPERATIONS PERFORMED BY A FLOATING-POINT UNIT

CROSS-REFERENCE TO RELATED PATENT APPLICATIONS

The following commonly owned and related applications are hereby incorporated by reference in their entirety for all purposes:

U.S. patent application Ser. No. 09/364,514, filed Jul. 30, 1999;

U.S. patent application Ser. No. 09/364,787, filed Jul. 30, 1999;

U.S. patent application Ser. No. 09/364,786, filed Jul. 30, 1999;

U.S. patent application Ser. No. 09/364,789, filed Jul. 30, 1999;

U.S. patent application Ser. No. 09/364,512, filed Jul. 30, 1999; and

U.S. patent application Ser. No. 09/363,638, filed Jul. 30, 1999.

BACKGROUND OF THE INVENTION

1. Field of the Invention

The present invention relates to floating-point arithmetic, and more specifically to a floating-point unit that implements Newton-Raphson convergent algorithms for determining reciprocals and reciprocal square roots.

2. Related Art

The reciprocal of a number (N) is defined as 1 divided by N. The reciprocal square root of N is defined as 1 divided by the square root of N.

In digital processing systems, numerical data is typically expressed using an integer or a floating-point representation. A floating-point representation is preferred in many applications because of its ability to express a wide range of values and its ease of manipulation for some specified operations. A floating-point representation includes three components: a sign bit (sign), a mantissa (M) and an exponent (exp). The floating-point number represented is $(-1)^{sign}*M*2^{exp}$.

A standard code for representing floating-point numbers is the "IEEE Standard for Binary Floating-Point Arithmetic," which is referred to herein as the IEEE-754 standard (or simply the IEEE standard) and incorporated herein by reference. In the IEEE standard the exponent consists of 8 bits for single precision floating-point numbers and 11 bits for double precision floating-point numbers, the mantissa consists of 23 bits for single precision and 52 bits for double precision. Additionally, for both single precision and double precision floating-point numbers there is a single bit that represents the sign of the number.

Many operations can be performed on floating-point numbers, including arithmetic operations, such as addition, subtraction, multiplication, division, and square roots. Because arithmetic operations with floating-point numbers require a great deal of computing power, many microprocessors come with a specialized integrated circuit, called a floating-point unit (FPU), for performing floating-point arithmetic. Floating-point units are also called math coprocessors, numeric coprocessors, coprocessors, or simply processors.

There are two major schemes utilized by an FPU in performing division and square root functions. The first scheme is "digit-by-digit", and the second scheme is "convergent approximation". In general, digit-by-digit schemes offer a short delay per iteration, but they also require a large number of iterations or clock-cycles. Additionally, digit-by-digit schemes produce a final remainder, which can be used to determine whether a result is exact or inexact.

Convergent approximations offer a faster convergence rate (lower number of iterations) than the digit-by-digit scheme, but they do not produce a final remainder; thus, one can not determine whether a result produced by a convergent approximation is exact or inexact. Nevertheless, convergent approximations provide approximate results that are adequate for most applications.

Convergent approximation algorithms for approximating reciprocals and reciprocal square roots include the Newton-Raphson algorithm. The Newton-Raphson algorithm for approximating the reciprocal of a number (N) is expressed as: $X_{i+1}=X_i*(2-N*X_i)$, where $X_i$ is an approximation of the reciprocal of N at the $i^{th}$ iteration, where i is greater than or equal to 1, and $X_{i+1}$ is a more accurate approximation. For example, if $X_i$ provides 14 bits of accuracy, $X_{i+1}$ provides an accuracy of 28 bits.

The Newton-Raphson algorithm for approximating the reciprocal square root of N is expressed as: $X_{i+1}=(3-N*X_i*X_i)*X_i/2$, where $X_i$ is an approximation of the reciprocal square root of N at the $i^{th}$ iteration, where i is greater than or equal to 1, and $X_{i+1}$ is a more accurate approximation.

What is desired is a method for implementing the Newton-Raphson approximations such that the accuracy of the approximations is increased, but that the performance of the system implementing the method is not negatively affected.

SUMMARY OF THE INVENTION

The present invention provides a method, and a system for implementing that method, for improving the accuracy of approximating the reciprocal of a number and the reciprocal square root of a number. The methods of the present invention do not negatively impact the performance of the system.

In one aspect, the invention provides a method for approximating the reciprocal square root of a number (N). This method includes the steps of: (a) estimating the reciprocal square root of N to produce an estimate $(X_i)$; (b) multiplying the estimate by N to produce a first intermediate result (IR1); (c) determining a second intermediate result (IR2) according to the equation: $IR2=(1-X_i*IR1)/2$; (d) multiplying the second intermediate result by the estimate to produce a third intermediate result; and (e) adding the third intermediate result to the estimate to produce an approximation of the reciprocal square root of the number.

This method provides one advantage because of the order in which the multiplication is performed makes it likely that all results will be in normalized form. Specifically, the Newton-Raphson algorithm requires one to determine the product of: $N*X_i*X_i$. The method according to the present invention first multiplies N by $X_i$ to produce an intermediate result. This intermediate result will likely be in normalized form, even when N is large. The method then multiplies the intermediate result by $X_i$ to produce: $(N*X_i)*X_i$. If the method first multiplied $X_i$ by $X_i$ to produce the intermediate result, the intermediate result would most likely be in denormalized form when N is large. It is disadvantageous to produce a denormal result because producing a denormal result causes a loss of accuracy. Therefore, although $(N*X_i)$ $*X_i$ is mathematically identical to $(X_i*X_i)*N$, the former is preferred because it avoids denormal intermediate results.

The above method provides another advantage because the result of step (c) is typically a very small number. This provides an advantage because when the result of step (c) is expressed in normalized floating-point form, the precision of the result is increased, thereby improving the approximation of the reciprocal.

In another aspect, the invention provides four instructions for implementing the above method for approximating the reciprocal square root of a number (N). These four instructions are executed by a floating-point unit. The four instruction include: a first instruction that enables the floating-point unit to produce an estimate ($X_i$) of the reciprocal square root of N; a second instruction that enables the floating-point unit to produce a first intermediate result (IR1) equal to $X_i$ multiplied by N; a third instruction that enables the floating-point unit to produce a second intermediate result (IR2) according to the equation: $IR2=(1-X_i*IR1)/2$; and a fourth instruction that enables the floating-point unit to produce an approximation ($X_{i+1}$) of the reciprocal square root of the number according to the equation: $X_{i+1}=X_i+X_i*IR2$.

In another aspect, the invention provides a single instruction for implementing the above method for approximating the reciprocal square root of a number (N). This instruction is also executed by a floating-point unit. The instruction enables the floating-point unit to produce an estimate ($X_i$) of the reciprocal square root of N; produce a first intermediate result (IR1) equal to $X_i$ multiplied by N; produce a second intermediate result (IR2) according to the equation: $IR2=(1-X_i*IR1)/2$; and, lastly, produce an approximation ($X_{i+1}$) of the reciprocal square root of N according to the equation: $X_{i+1}=X_i+X_i*IR2$.

In another aspect, the invention provides a computer program product having a computer useable medium having floating-point instructions stored therein. The floating-point instructions enable a floating-point unit to approximate the reciprocal square root of a number (N). The floating-point instructions include: a first instruction to enable the floating-point unit to produce an estimate ($X_i$) of the reciprocal square root of the number; a multiply instruction to enable the floating-point unit to produce a first intermediate result (IR1) equal to the estimate multiplied by the number; a second instruction to enable the floating-point unit to produce a second intermediate result (IR2) according to the equation: $IR2=(1-X_i*IR1)/2$; and a third instruction to enable the floating-point unit to produce an approximation ($X_{i+1}$) of the reciprocal square root of the number according to the equation: $X_{i+1}=X_i+X_i*IR2$.

In another aspect, the invention provides a method for approximating the reciprocal of a number (N). The method includes the steps of: (a) retrieving the number from a floating-point memory, wherein the number is stored in the memory in a memory format; (b) unpacking the number from the memory format to an internal format; (c) estimating the reciprocal of the number to produce an estimate ($X_i$); (d) determining a first intermediate result (IR1) according to the equation: $IR1=1-N*X_i$; (e) multiplying the first intermediate result by the estimate to produce a second intermediate result; (f) adding the estimate to the second intermediate result to produce an approximation of the reciprocal of the number, wherein the approximation is in the internal format; (g) packing the approximation from the internal format to the memory format; and (h) writing the approximation in the memory format to the floating-point memory.

The result of step (d) is typically a very small number. This provides an advantage because when the result of step (d) is expressed in normalized floating-point form, the precision of the result is increased, thereby improving the approximation of the reciprocal.

In another aspect, the invention provides a computer program product comprising a computer useable medium having a floating-point instruction stored therein. The floating-point instruction enables a floating-point unit to approximate the reciprocal of a number (N). More specifically, the floating-point instruction enables the floating-point unit to produce an estimate ($X_i$) of the reciprocal of the number, produce an intermediate result (IR) according to the equation: $IR=1-N*X_i$, and produce an approximation ($X_{i+1}$) of the reciprocal of the number according to the equation: $X_{i+1}=X_i+X_i*IR$.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate a preferred embodiment of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
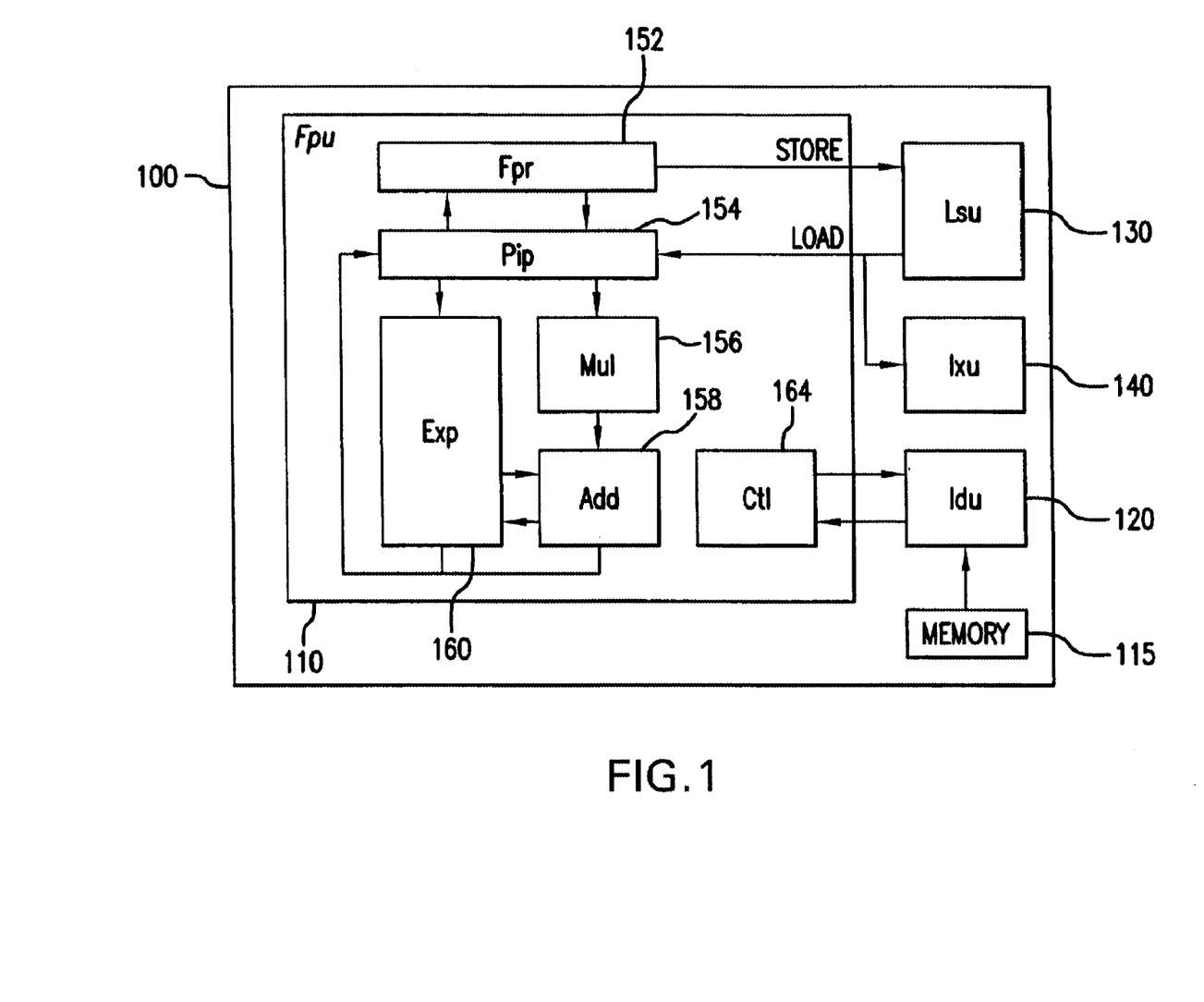
FIG. 1 is a block diagram of a portion of a computer system according to one embodiment of the invention.

FIG. 1 is a block diagram of a portion of a computer system 100 according to one embodiment of the invention. Computer system 100 includes a floating-point unit (FPU) 110 that implements a floating-point instruction set. FPU 110 supports the IEEE-754 standard and enhances, among other things, geometric computations in 3 D-graphics applications executed on computer system 100. In a preferred embodiment, FPU 110 is implemented with a super-pipelined, multiply-add micro-architecture. At its peak, FPU 110 can execute one floating-point instruction and one floating-point load/store instruction per cycle.

Computer system 100 further includes an instruction dispatch unit (IDU) 120, a load store unit (LSU) 130, and an integer execution unit (IXU) 140. IDU 120 is interfaced with instruction memory 115, which stores, among other things, floating-point instructions. IDU 120 dispatches the floating-point instructions to FPU 110 and keeps track of the state of each dispatched floating-point instruction, the register dependency, and the possibility of bypassing a resultant operand to the next FPU instruction. FPU 110 performs floating-point computations, as directed by the floating-point instructions dispatched by IDU 120. LSU 130 interfaces with other elements that are internal or external to processor 100, and provides data to, and receives data from FPU 110. For example, operands are loaded from LSU 130 to FPU 110 and results are stored from FPU 110 to LSU 130. IXU 140 performs integer computations, and is able to transfer data to, and receive data from, FPU 110.

FPU 110 includes a floating-point register file (FPR) 152 that interfaces with LSU 130. FPR 152 includes a number of read ports and a number of write ports. More specifically, in one embodiment, FPR 152 is a 32-entry 64-bit register file with four read ports and two write ports.

A floating-point pipe file (PIP) 154 couples to FPR 152 and further interfaces with LSU 130 and IXU 140. For each instruction, PIP 154 selects and receives operands from, among other sources, FPR 152. PIP 154 then unpacks the received operands from an IEEE compliant format (also referred to herein as "memory format") into an internal data format recognized by the processing units within FPU 110. The internal data format of PIP 154 is similar to the IEEE-754 standard format, except that, among other things, the internal data format utilizes a 12-bit exponent field. The 12-bit exponent field provides an advantage in that it makes it likely that all intermediate results can be represented in normalized form. PIP 154 also packs the results from FPU 110 into the memory format (i.e., IEEE compliant format) required by the external circuitry and provides the packed results to FPR 152.

A floating-point multiplier (MUL) 156 couples to PIP 154 and executes floating-point multiply instructions as well as the multiply portion of compound instructions such as a multiply-add (MADD) instruction. MUL 156 receives the mantissas of two operands from PIP 154. MUL 156 is described in further detail in U.S. patent application Ser. No. 09/364,514.

A floating-point adder (ADDER) 158 couples to PIP 154 and MUL 156. ADDER 158 executes floating-point add and subtract instructions as well as the add portion of compound instructions such as MADD. ADDER 158 receives two operands and performs floating-point magnitude addition/subtraction using, for example, a prescale adder (PSA) operated in parallel with a massive cancellation adder (MCA). The final output is selected from one of the adders based on, among other things, the exponent difference of the two input operands. The final output is then provided to PIP 154 for storage. Selection criteria for PSA and MCA is further described in the above-referenced U.S. patent application Ser. No. 09/364,512. ADDER 158 is also described in further detail in U.S. patent application Ser. No. 09/364,514.

A floating-point exponent unit 160 functions to determine the exponent of a result of a given floating-point arithmetic operation. In general, exponent unit 160 can determine approximately what the result exponent will be from the exponents of the operands, but it must interact with the mantissa calculation units (e.g., MUL 156 and ADDER 158) to determine how to adjust the result exponent value based on normalization shifts. Additionally, exponent section 160 performs overflow/underflow prediction, as well as detection.

A floating-point control unit 164 is the control unit for FPU 110. Floating-point instructions are sent to control unit 164 from IDU 120. IDU 120 receives instructions stored in instruction memory 115. Instruction memory 115 is a conventional computer useable medium, such as a random access memory or a read only memory, for storing program instructions. Control unit 164 interacts with each above described floating-point section and directs the data path through the proper sequence of operations to generate the proper output.

Reciprocal and reciprocal square root operations can be performed by FPU 110 utilizing the Newton-Raphson convergent approximation algorithms. The Newton-Raphson reciprocal algorithm for approximating the reciprocal of a number (N) is defined as: $X_{i+1}=X_i*(2-N*X_i)$, where $X_i$ is an estimated result at iteration i, where i is an integer (e.g., 1, 2, 3, ... n), and $X_{i+1}$ is a more accurate approximation. The Newton-Raphson reciprocal square root algorithm for approximating the reciprocal square root of N is defined as: $X_{i+1}=(3-N*X_i*X_i)*X_i/2$, where $X_i$ is an initial approximation of the reciprocal square root of the number, and $X_{i+1}$ is a more accurate approximation.

Figure 2:
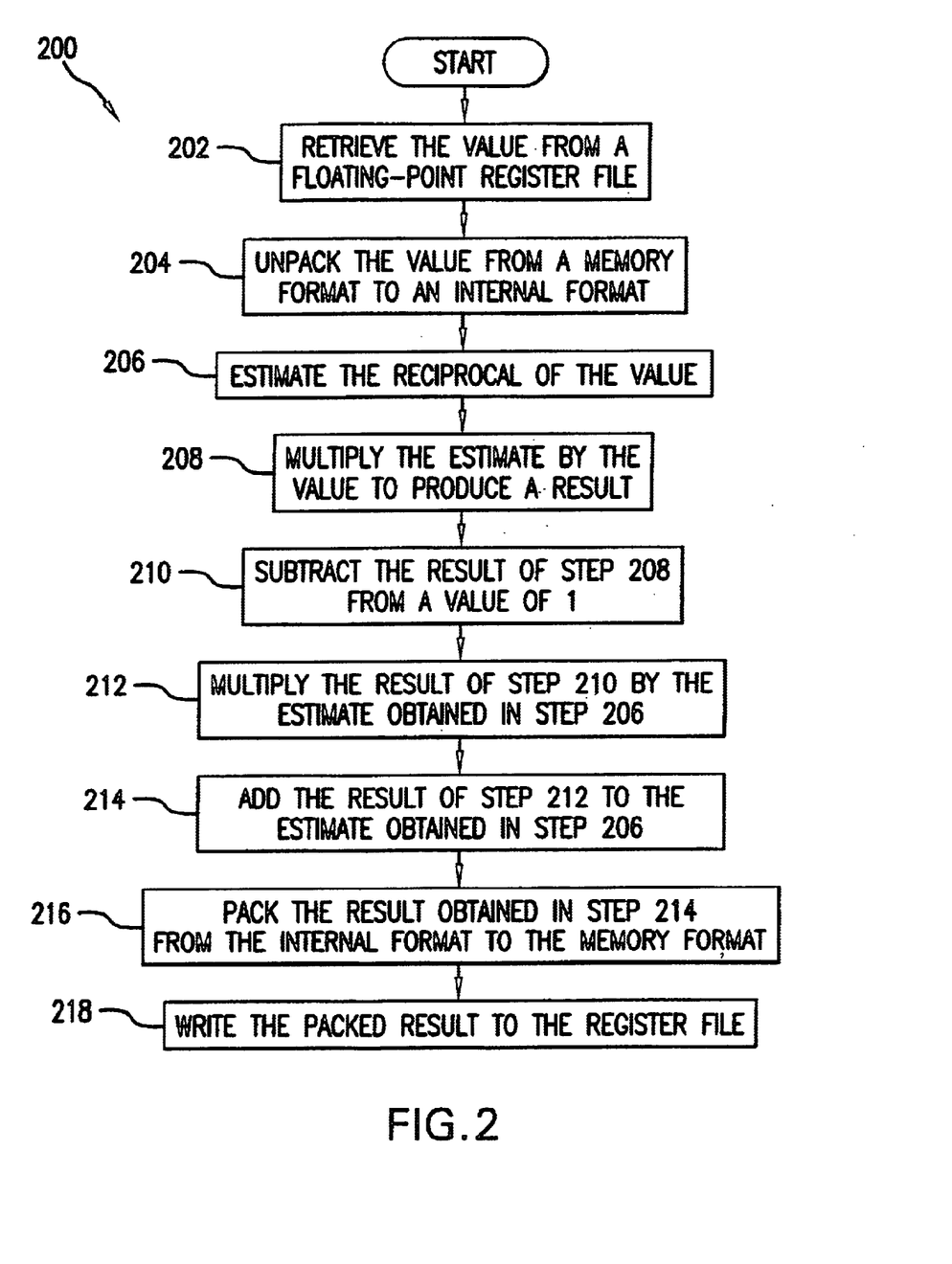
FIG. 2 illustrates a method for performing an iteration of the Newton-Raphson algorithm for approximating the reciprocal of a number.
Figure 3:
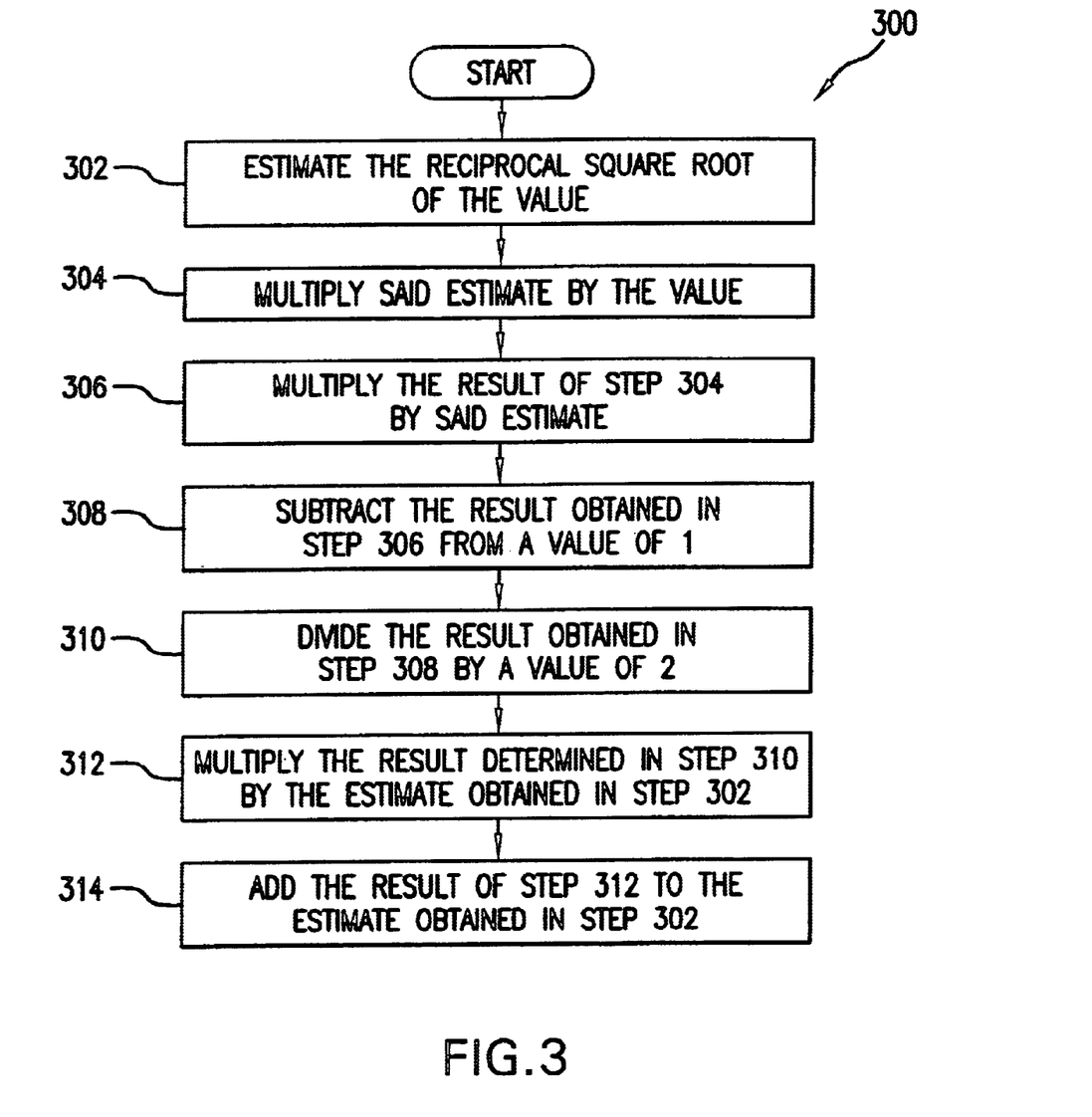
FIG. 3 illustrates a method for performing an iteration of the Newton-Raphson algorithm for approximating the reciprocal square root of a number.

A method 200, according to the present invention, for performing an iteration of the Newton-Raphson reciprocal algorithm is illustrated in FIG. 2, and a method 300, according to the present invention, for performing an iteration of the Newton-Raphson reciprocal square root algorithm is illustrated in FIG. 3.

Referring now to FIG. 2, the method 200 for performing an iteration of the Newton-Raphson algorithm for approximating the reciprocal of a number begins in step 202. In step 202 the number, which is in the memory format, is retrieved from a floating-point memory, such as floating-point register file 152 or load/store unit 130, for example. In step 204, the number is unpacked from the memory format to the internal format. In step 206, an estimate of the reciprocal of the number is determined. Any known or future developed method or means for estimating the reciprocal of a number may be used in step 206. However, in one embodiment, the estimate is determined by using a lookup table as described in U.S. patent application Ser. No. 09/364,787.

Next, in step 208, the estimate is multiplied by the number. Then, in step 210, the result of step 208 is subtracted from one (1). By subtracting the result of step 208 from a value of 1 as opposed to a value of 2, the result of step 210 is usually a very small number, which when represented in normalized form provides for a greater accuracy, thereby improving the approximation of the reciprocal of the number.

In step 212, the result produced in step 210 is multiplied by the estimate. In step 214, the result of step 212 is added to the estimate. The result of step 214 is an approximation of the reciprocal of the number. A more accurate approximation can be achieved by setting the estimate equal to the result of step 214 and repeating steps 208–214. Additional such iterations of method 200 further increases the accuracy of the approximation. In step 216, the result of step 214 is packed from the internal format into the memory format, and in step 218 the packed result is written to the floating-point memory.

Referring now to FIG. 3, the method 300 for performing an iteration of the Newton-Raphson algorithm for approximating the reciprocal square root of a number begins in step 302. In step 302, an estimate of the reciprocal of the square root of the number is determined. Any known or future developed method or means for estimating the reciprocal of a number may be used in step 302. However, in one embodiment, the estimate is determined by using a lookup table as described in U.S. patent application Ser. No. 09/364,787.

Figure 4A:
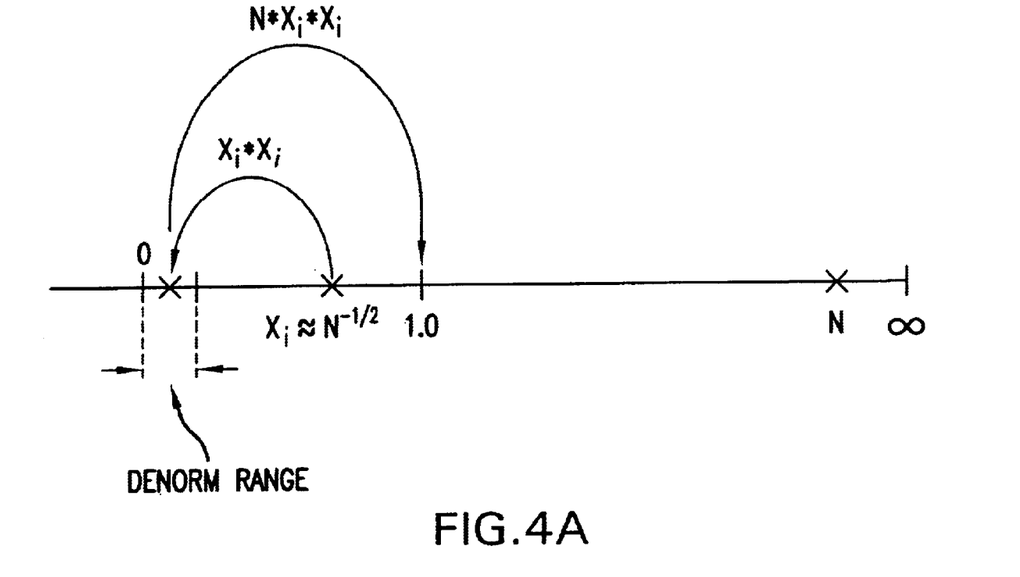
FIGS. 4A and 4B illustrate the importance of the order in which a multiplication is performed with respect to the Newton-Raphson reciprocal square root algorithm.
Figure 4B:
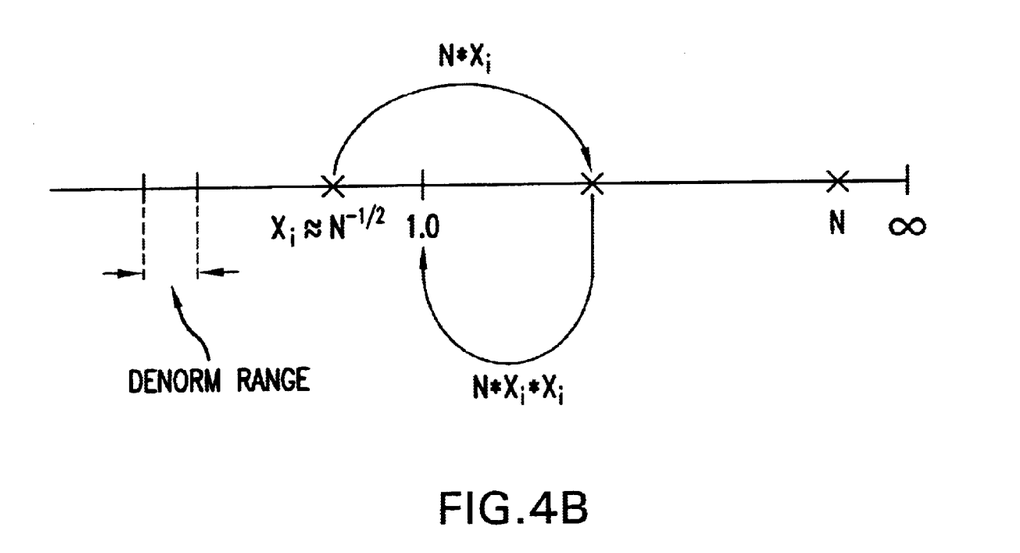

Next, in step 304, the estimate is multiplied by the number. Then, in step 306, the result produced in step 304 is multiplied by the estimate. In step 308, the result produced in step 306 is subtracted from one (1). By subtracting the result of step 306 from a value of 1 as opposed to a value of 3, the result of step 308 is usually a very small number, which when represented in normalized form provides for a greater accuracy, thereby improving the approximation of the reciprocal square root of the number. Additionally, by first multiplying the estimate by the number and then multiplying that result by the estimate, the method will likely avoid a denormalized result that might have occurred had the method first multiplied the estimate by itself to produce a result and then multiplied the result by the number. Consequently, the order in which the multiplication occurs in accordance with the present invention is advantageous. This concept is illustrated in FIGS. 4A and 4B. FIG. 4A illustrates that if one were to first multiply the estimate (represented as $X_i$) by itself to produce a first result ($X_i * X_i$) and then multiply the first result by the number (N) to produce a second result $N*(X_i*X_i)$, the first result, ($X_i*X_i$), will likely be a denorm result (i.e., fall within the range of denorm numbers) if the number (N) is a large number. Whereas, FIG. 4B illustrates that if one were to first multiply the estimate ($X_i$) by the number (N) to produce a first result ($N*X_i$) and then multiply the first result by the estimate to produce a second result ($N*X_i)*X_i$, the first result, ($N*X_i$), will likely not be a denorm result, even when the number (N) is a large number.

In step 310, the result produced in step 308 is divided by a value of 2. That is, the exponent of the result produced in step 308 is reduced by one (1). In step 312, the result produced in step 310 is multiplied by the estimate determined in step 302. Lastly, in step 314, the result of step 312 is added to the estimate determined in step 302. The result of step 314 is an approximation of the reciprocal of the square root of the number. A more accurate approximation can be achieved by setting the estimate equal to the result of step 314 and repeating steps 304–314. Additional such iterations of method 300 further increases the accuracy of the approximation.

The floating-point instruction set architecture (ISA) for FPU 110 includes instructions for implementing the above methods. More specifically, in one embodiment, the ISA includes three instructions for implementing an iteration of the Newton-Raphson reciprocal algorithm. The three instruction are: RECIP 1 (operand1), RECIP2(operand1, operand2) and MADD(operand1, operand2, operand3).

The RECIP1(operand1) instruction enables FPU 110 to produce a result that is an estimate of the reciprocal of operand1. There are a variety of ways for producing the estimate. In one embodiment, a lookup table is used. Instruction RECIP2(operand1, operand2) enables FPU 110 to produce a result equal to: (1−operand1*operand2). The MADD instruction is a multiply-add instruction and it enables FPU 110 to produce a result equal to: (operand1+ operand2*operand3). The RECIP1 and RECIP2 instructions are further described in U.S. patent application Ser. No. 09/364,787.

The Newton-Raphson algorithm for approximating the reciprocal of a number (N) is implemented by using FPU 110 to execute the above mentioned instructions in the following sequence:

(1) $X_i$=RECIP1(N);

(2) IR+RECIP2(N, $X_i$); and (3) $X_{i+1}$=MADD($X_i$, $X_i$, IR).

After FPU 110 executes the above three instructions in the above given sequence, $X_{i+1}=X_i+X_i*IR+X_i+X_i*(1-N*X_i)= 2X_i-N*X_i*X_i=X_i*(2-N*X_i)$, which is the Newton-Raphson approximation for the reciprocal of N.

An advantage of the above instructions is that the value of IR produced by the RECIP2(N, $X_i$) instruction is usually a very small number, which when normalized provides a great deal of precision, thereby increasing the accuracy of the approximation. The reason the value of IR is usually a very small number is that the value of $N*X_i$ is nearly equal to one, being nearly equal to $N*(1/N)$; that is why when one subtracts $N*X_i$ from 1, as opposed to two (2), the result is a small number.

A consequence of subtracting $N*X_i$ from one (1), as opposed to two (2), is that it necessitates the MADD instruction. Had $N*X_i$ been subtracted from two(2) instead of one (1), the MADD instruction would be replaced by a simple multiply instruction. Typically, a multiply instruction is preferred over a MADD instruction because a MADD instruction conventionally has a greater latency than a multiply instruction. However, because FPU 110 is implemented with a multiply-add pipeline, the latency of the MADD instruction is the same as the latency of a multiply instruction. Therefore, not only does the above method and sequence of instructions improve the accuracy of a reciprocal operation, but it can do so adding little or no delay.

The ISA also includes a RECIP(N) instruction. This single instruction is equivalent to the sequence of three instructions described above. That is, the RECIP instruction first causes FPU 110 to produce and estimate ($X_i$) of the reciprocal of N. Then it causes FPU 110 to produce an intermediate result (IR) according to the equation: $1-N*X_i$. The intermediate result is stored in PIP 154 in the internal format. By storing intermediate results in the internal format, denormalized numbers are typically avoided. Finally, the RECIP instruction causes FPU 110 to produce an approximation ($X_{i+1}$) of the reciprocal of the number (N) according to the following equation: $X_{i+1}=X_i+X_i*IR$. The approximation of the reciprocal of the number is stored in FPR 152 in the IEEE standard format.

In addition to providing instructions for approximating reciprocals, the floating-point ISA includes four instructions for performing an iteration of the Newton-Raphson algorithm for approximating reciprocal square roots. The four instruction are: RSQRT1(operand1), RSQRT2(operand1, operand2), MUL(operand1, operand2), and MADD (operand1, operand2, operand3).

The RSQRT 1(operand1) instruction enables FPU 110 to produce a result that is an estimate of the reciprocal square root of the operand. There are a variety of ways for producing the estimate. In one embodiment, a lookup table is used.

Instruction RSQRT2(operand1, operand2) enables FPU 110 to produce a result equal to: (1−operand1*operand2)/2. The MADD(operand1, operand2, operand3) instruction is described above. The MUL(operand1, operand2) instruction is a multiply instruction that enables FPU 110 to produce a result equal to: operand1*operand2. The RSQRT1 and RSQRT2 instructions are further described in U.S. patent application Ser. No. 09/364,787.

The Newton-Raphson algorithm for approximating the reciprocal square root of a number (N) is implemented by using FPU 110 to execute the above mentioned instructions in the following sequence:

(1) $X_i$=RSQRT1(N);

(2) IR1=MUL(N, $X_i$)

(3) IR2=RSQRT2(IR1, $X_i$); and (4) $X_{i+1}$=MADD($X_i$, $X_i$, IR2). After FPU 110 executes the above four instructions in the above given sequence, $X_{i+1}=(3-N*X_i*X_i)*X_i/2$, which is the Newton-Raphson approximation for the reciprocal square root of N.

An advantage of the above instructions is that the intermediate result, IR1, is likely to be within the range of values that can be represented in normalized form as opposed to denormalized form. Because of accuracy considerations, it is preferably to represent values in normalized form.

Another advantage of the above instructions is that the value of IR2 produced by the RSQRT2(IR1, $X_i$) instruction is usually a very small number, which when normalized provides a great deal of precision, thereby increasing the accuracy of the approximation. The reason the value of IR2 is usually a very small number is that the value of IR1*$X_i$ is nearly equal to one, being nearly equal to $N^{1/2}*(1/N^{1/2})$; that is why when one subtracts IR1*$X_i$ from 1, as opposed to three (3), the result is a small number.

A consequence of subtracting IR1*$X_i$ from one (1), as opposed to three (3), is that it necessitates the MADD instruction. Had IR1*$X_i$ been subtracted from three (3) instead of one (1), the MADD instruction would be replaced by a simple multiply instruction. As discussed above, conventionally, a multiply instruction is preferred over a MADD instruction because a MADD instruction typically has a greater latency than a multiply instruction. However, because FPU 110 is implemented with a multiply-add pipeline, the latency of the MADD instruction is the same as the latency of a multiply instruction. Therefore, not only does the above method and sequence of instructions improve the accuracy of a reciprocal square root operation, but it can do so adding little or no delay.

The ISA also includes an RSQRT(N) instruction. This single instruction is equivalent to the sequence of four instructions described above. That is, the RSQRT instruction first causes FPU 110 to produce and estimate ($X_i$) of the reciprocal square root of N. Then it causes FPU 110 to produce a first intermediate result (IR1) according to the following equation: IR1=N*$X_i$. Next, it causes FPU 110 to produce a second intermediate result (IR2) according to the following equation: IR2=(1−IR1*$X_i$)/2. Both intermediate results, IR1 and IR2, are stored using the internal format in PIP 154. By storing intermediate results in the internal format, denormalized numbers are typically avoided. Finally, the RSQRT(N) instruction causes FPU 110 to produce an approximation ($X_{i+1}$) of the reciprocal square root of N according to the following equation: $X_{i+1}=X_i+X_i*IR2$. The approximation of the reciprocal square root of N is stored in FPR 152 in the IEEE standard format.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer method for approximating the reciprocal square root of a number, comprising:

(a) estimating the reciprocal square root of the number to produce an estimate ($X_i$);

(b) multiplying said estimate by the number to produce a first intermediate result (IR1);

(c) determining a second intermediate result (IR2) according to the equation: IR2=(1−$X_i$*IR1)/2;

(d) multiplying said second intermediate result by said estimate to produce a third intermediate result; and (e) adding said third intermediate result to said estimate to produce an approximation of the reciprocal square root of the number.

2. The method of claim 1, further comprising the steps of:

retrieving the number from a floating-point memory, wherein the number is stored in said memory in a memory format; and unpacking the number from said memory format to an internal format prior to estimating the reciprocal square root of the number to produce said estimate ($X_i$).

3. The method of claim 2, further comprising the steps of:

packing said approximation from said internal format to said memory format; and writing said approximation in said memory format to said floating-point memory.

4. The method of claim 2, wherein said internal format has an exponent of at least 12-bits, and said memory format has an exponent of not more than 11-bits.

5. The method of claim 1, further comprising the steps of:

setting said estimate ($X_i$) equal to said approximation; and repeating steps (b) through (e).

6. In a computer system having a floating-point unit, a method for determining the reciprocal square root of a number, comprising:

(a) providing an estimate instruction to the floating-point unit that enables the floating-point unit to produce an estimate ($X_i$) of the reciprocal square root of the number;

(b) providing a multiply instruction to the floating-point unit that enables the floating-point unit to produce a first intermediate result (IR1) equal to said estimate multiplied by said number;

(c) providing an instruction to said floating-point unit that enables the floating-point unit to produce a first intermediate result (IR1) according to the equation: IR2=(1−$X_i$*IR1)/2; and (d) providing a multiply-add instruction to said floating-point unit that enables the floating-point unit to produce an approximation ($X_{i+1}$) of the reciprocal square root of the number according to the equation: $X_{i+1}=X_i+X_1*IR2$.

7. A computer system having a processor in communication with a storing means for storing instructions that enable the processor to perform arithmetic operations, the instructions comprising:

a first instruction to enable the processor to produce an estimate ($X_i$) of a reciprocal square root of a number;

a multiply instruction to enable the processor to calculate a first intermediate result (IR1) of said estimate multiplied by said number;

a second instruction to enable the processor to produce a second intermediate result (IR2) according to the equation: IR2=(1−$X_i$*IR1)/2; and a third instruction to enable the processor to produce an approximation ($X_{i+1}$) of the reciprocal square root of said number according to the equation: $X_{i+1}=X_i+X_i*IR2$.

8. The computer system of claim 7, wherein said storing means comprises a random access memory for storing the instructions.

9. The computer system of claim 7, wherein said processor is a floating-point unit, wherein said floating-point unit executes said first instruction to produce said estimate of the reciprocal square root of said number, executes said multiply instruction to calculate said first intermediate result, executes said second instruction to produce said second intermediate result, and executes said third instruction to produce said approximation.

10. A computer system having a processor in communication with a storing means for storing instructions that enable the processor to perform arithmetic operations, the instructions comprising an instruction that enables the processor to produce an estimate ($X_i$) of the reciprocal square root of a number, calculate a first intermediate result (IR1) of said estimate multiplied by said number, produce a second intermediate result (IR2) according to the equation: IR2=$(1-X_i*IR1)/2$, and produce an approximation ($X_{i+1}$) of the reciprocal square root of said number according to the equation: $X_{i+1}=X_i+X_i*IR2$.

11. The computer system of claim 10, wherein said instruction further enables the processor to first retrieve said number from a floating-point memory, wherein said number is stored in said memory in a memory format, and then enables the processor to unpack said number from said memory format to an internal format prior to enabling the processor to produce said estimate.

12. The computer system of claim 11, wherein said approximation is in said internal format, and wherein said instruction further enables the processor to pack said approximation from said internal format to said memory format, and to write said approximation in said memory format to said floating-point memory.

13. The computer system of claim 11, wherein said internal format has an exponent of at least 12-bits, and said memory format has an exponent of not more than 11-bits.

14. A computer program product comprising a computer useable medium having floating-point instructions stored therein, the floating-point instructions for enabling a floating-point unit to approximate the reciprocal square root of a number (N), wherein the floating-point instructions comprise:
   a first instruction to enable the floating-point unit to produce an estimate ($X_i$) of the reciprocal square root of said number;
   a multiply instruction to enable the floating-point unit to produce a first intermediate result (IR1) equal to said estimate multiplied by said number;
   a second instruction to enable the floating-point unit to produce a second intermediate result (IR2) according to the equation: IR2=$(1-X_i*IR1)/2$; and
   a third instruction to enable the floating-point unit to produce an approximation ($X_{i+1}$) of the reciprocal square root of said number according to the equation: $X_{i+1}=X_i+X_i*IR2$.

15. A computer program product comprising a computer useable medium having a floating-point instruction stored therein, the floating-point instruction for enabling a floating-point unit to approximate the reciprocal square root of a number (N), wherein the floating-point instruction enables the floating-point unit to produce an estimate ($X_i$) of the reciprocal square root of said number, produce a first intermediate result (IR1) equal to said estimate multiplied by said number, produce a second intermediate result (IR2) according to the equation: IR2=$(1-X_i*IR1)/2$, and produce an approximation ($X_{i+1}$) of the reciprocal square root of said number according to the equation: $X_{i+1}=X_i+X_i*IR2$.

16. The computer program product of claim 15, wherein said floating-point instruction enables the floating-point unit to first retrieve said number from a floating-point memory, wherein said number is stored in said memory in a memory format, and then enables the floating-point unit to unpack said number from said memory format to an internal format prior to enabling the floating-point unit to produce said estimate.

17. The computer program product of claim 16, wherein said approximation is in said internal format, and wherein said floating-point instruction further enables the floating-point unit to pack said approximation from said internal format to said memory format, and to write said approximation in said memory format to said floating-point memory.

18. The computer program product of claim 16, wherein said internal format has an exponent of at least 12-bits, and said memory format has an exponent of not more than 11-bits.

19. A computer system, comprising:
   a floating-point unit;
   a memory for storing a sequence of instructions that enables said floating-point unit to approximate the reciprocal square root of a number (N), said sequence of instructions comprising:
      a first instruction to enable said floating-point unit to produce an estimate ($X_i$) of the reciprocal square root of said number;
      a multiply instruction to enable said floating-point unit to produce a first intermediate result (IR1) equal to said estimate multiplied by said number;
      a second instruction to enable said floating-point unit to produce a second intermediate result (IR2) according to the equation: IR2=$(1-X_1*IR1)/2$; and
      a third instruction to enable said floating-point unit to produce and approximation ($X_{i+1}$) of the reciprocal square root of said number according to the equation: $X_{i+1}=X_i+X_i*IR2$; and
   an instruction dispatch unit for dispatching said sequence of instructions from said memory to said floating-point unit.

20. The computer system of claim 19, wherein said floating-point unit comprises:
   a floating-point register file that stores said number in a memory format;
   a floating-point pipe file coupled to said floating-point register file, wherein said floating-point pipe file selects said number from said floating-point register file and unpacks said number into an internal format; and
   a floating-point arithmetic unit, coupled to said pipe file, that receives said unpacked number from said pipe file and performs an arithmetic operation using said number to produce a result in said internal format.

21. The computer system of claim 20, wherein said result is sent to said pipe file, said pipe file packs said result into said memory format, and said pipe file writes said result in said memory format to said floating-point register file.

22. The computer system of claim 20, wherein said arithmetic unit comprises a floating-point mantissa multiplier coupled to said pipe file.

23. The computer system of claim 20, wherein said arithmetic unit comprises a floating-point mantissa adder coupled to said mantissa multiplier.

24. The computer system of claim 23, wherein said internal format has an exponent of at least 12-bits, and said memory format has an exponent of not more than 11-bits.

* * * * *

UNITED STATES PATENT AND TRADEMARK OFFICE
CERTIFICATE OF CORRECTION

PATENT NO. : 6,912,559 B1
DATED : June 28, 2005
INVENTOR(S) : Ho et al.

It is certified that error appears in the above-identified patent and that said Letters Patent is hereby corrected as shown below:

<u>Column 12,</u>
Line 29, "$IR2=(1-X_1*IR1)/2$" should read -- $IR2=(1-X_i*IR1)/2$ --.

Signed and Sealed this

Eleventh Day of October, 2005

JON W. DUDAS
*Director of the United States Patent and Trademark Office*